United States Patent
Lu et al.

(10) Patent No.: US 11,188,483 B2
(45) Date of Patent: Nov. 30, 2021

(54) ARCHITECTURE FOR MICROCONTROLLER AND METHOD FOR READING DATA APPLIED TO MICROCONTROLLER

(71) Applicant: HON HAI PRECISION INDUSTRY CO., LTD., New Taipei (TW)

(72) Inventors: Chun-Ming Lu, New Taipei (TW); Chien-Fa Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/883,893

(22) Filed: May 26, 2020

(65) Prior Publication Data

US 2021/0133129 A1 May 6, 2021

(30) Foreign Application Priority Data

Nov. 4, 2019 (CN) .......................... 201911067187.6

(51) Int. Cl.
  *G06F 13/16* (2006.01)
  *G06F 13/28* (2006.01)
  *G06F 13/40* (2006.01)

(52) U.S. Cl.
  CPC .......... *G06F 13/1684* (2013.01); *G06F 13/28* (2013.01); *G06F 13/4027* (2013.01)

(58) Field of Classification Search
  CPC ... G06F 13/1684; G06F 13/28; G06F 13/4027
  See application file for complete search history.

(56) References Cited

U.S. PATENT DOCUMENTS

| 6,247,084 B1 * | 6/2001 | Apostol, Jr. ........ G06F 13/1684 710/100 |
| 7,689,758 B2 | 3/2010 | Tiennot |
| 2018/0004628 A1 * | 1/2018 | Strong ................ G06F 9/30145 |
| 2020/0210070 A1 * | 7/2020 | Durham .............. G06F 12/0895 |

FOREIGN PATENT DOCUMENTS

TW  200912660 A  3/2009

* cited by examiner

*Primary Examiner* — Henry Tsai
*Assistant Examiner* — Aurangzeb Hassan
(74) *Attorney, Agent, or Firm* — ScienBiziP, P.C.

(57) ABSTRACT

An architecture for a microcontroller includes a microcontroller, a system memory, an instruction memory, a data memory, a first bus, and a second bus, where the first and second buses perform functions of a single bus. The microcontroller connects to both buses. The instruction memory and the data memory are connected to the first bus. The system memory is connected to the second bus. The microcontroller transmits and receives data to and from the instruction memory and the data memory through the first bus. The microcontroller transmits and receives data to and from the system memory through the second bus. The instruction memory and the data memory transmit and receive data to and from the system memory through the second bus connected to the first bus, avoiding delays caused by rights and priorities and arbitration of same.

9 Claims, 3 Drawing Sheets

ARCHITECTURE FOR MICROCONTROLLER AND METHOD FOR READING DATA APPLIED TO MICROCONTROLLER

FIELD

The subject matter herein generally relates to microcontrollers, and in particular to a microcontroller architecture and a data reading method thereof.

BACKGROUND

As the prior art of FIG. 1 shows, a traditional microcontroller architecture generally includes a microcontroller, a Direct Memory Access (DMA), a system memory, an instruction memory, a data memory, an external device, and a bus. The microcontroller, the DMA, the instruction memory, the data memory, the system memory, and the external device are all connected to the bus. Then, the bus will undertake a task of all data transmission and reception. For example, the microcontroller sends and receives data with the system memory and the external device directly through the bus and instruction lines, data lines, or system lines. Since one slave port can be connected to many master ports, for example, the slave port of the DMA can be connected to the master ports of the microcontroller (e.g., instruction lines, data lines, system lines), which will prevent the microcontroller sending and receiving data in the shortest time, thereby causing unnecessary delays.

Furthermore, the traditional microcontroller architecture usually stores data and instructions in the data stack and instruction stack in the system memory. At the same time, the system memory needs to support data transmission of multiple master ports. Then, the system memory will have a performance bottleneck and issues of priorities and arbitration of priorities may cause substantial delay.

Therefore, there is room for improvement within the art.

BRIEF DESCRIPTION OF THE DRAWINGS

Many aspects of the disclosure can be better understood with reference to the figure. The components in the figures are not necessarily drawn to scale, the emphasis instead being placed upon clearly illustrating the principles of the disclosure.

DETAILED DESCRIPTION

Figure 1:
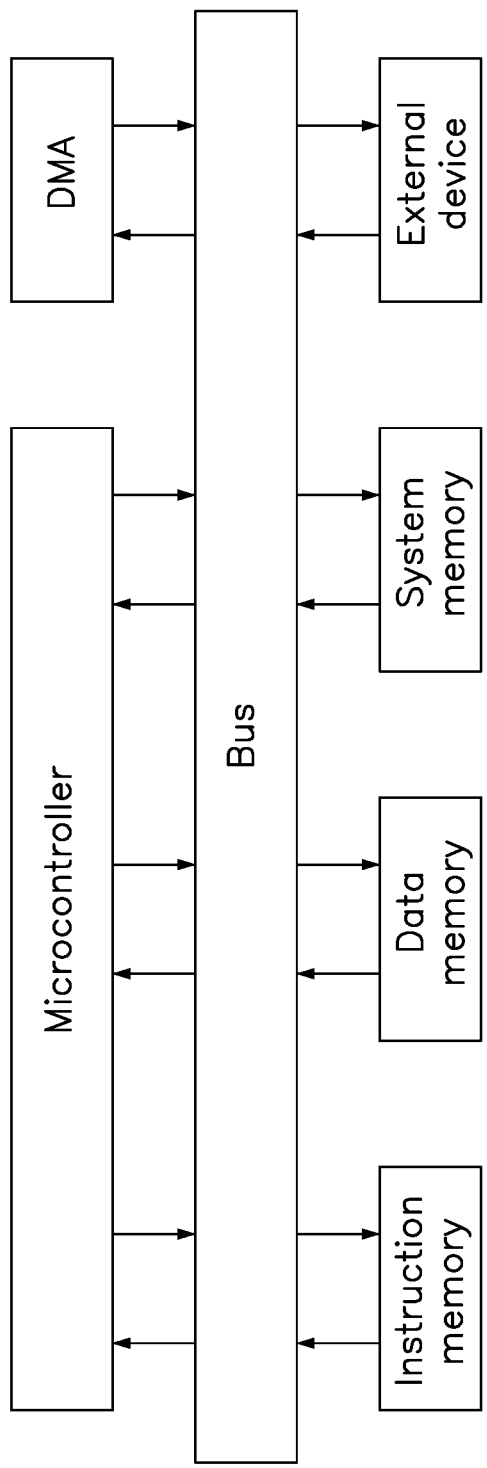
FIG. 1 is a block diagram of a microcontroller architecture of prior art.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 2:
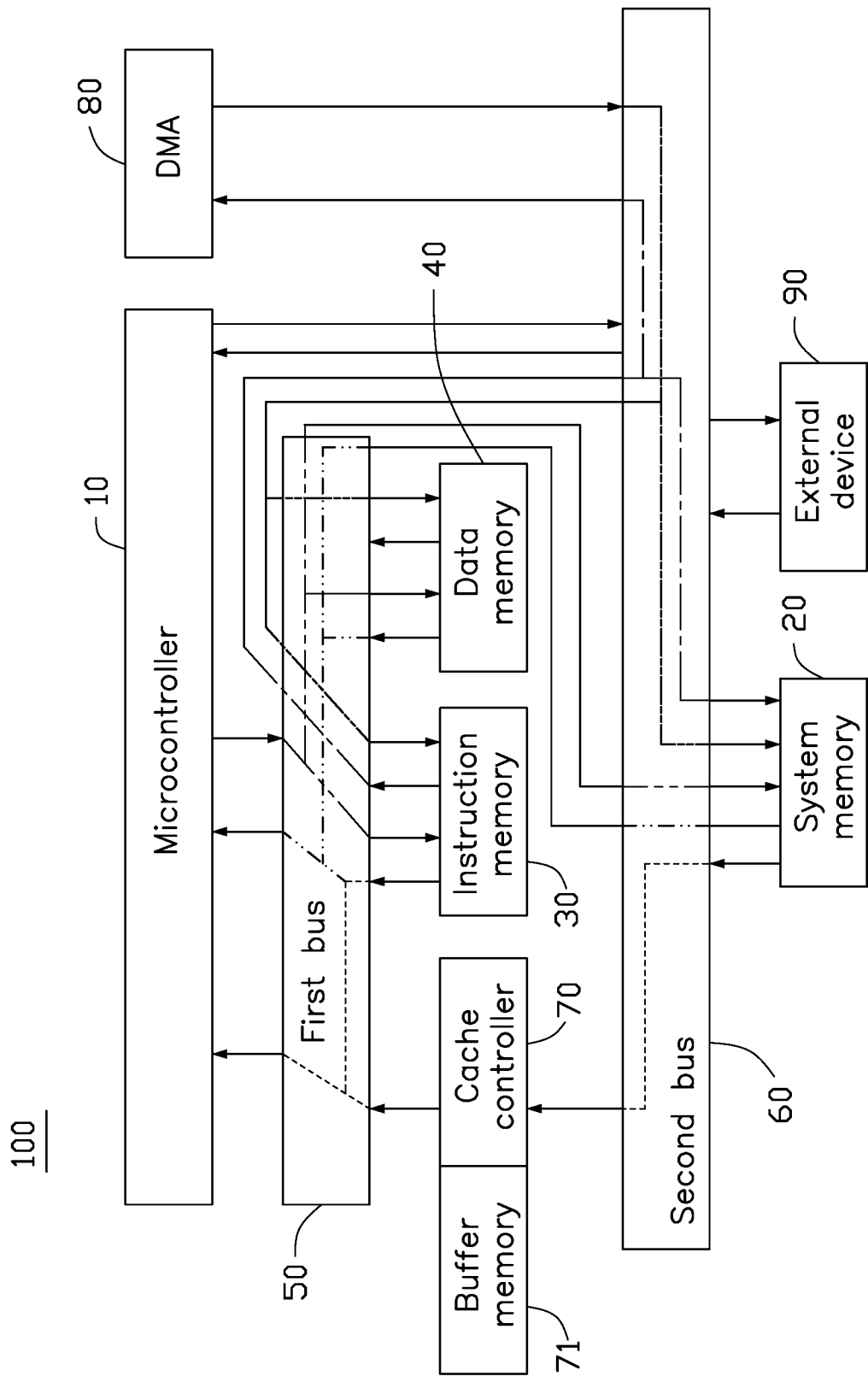
FIG. 2 is a block diagram of a microcontroller architecture according to an embodiment of the present disclosure.

FIG. 2 illustrates a microcontroller architecture 100 according to an embodiment of the present disclosure. In this embodiment, the microcontroller architecture 100 includes, but is not limited to, a microcontroller 10, a system memory 20, an instruction memory 30, a data memory 40, a first bus 50, a second bus 60, a cache controller 70, a buffer memory 71, a DMA 80, and an external device 90.

In this embodiment, the microcontroller 10 is both electrically connected to the first bus 50 and the second bus 60. The buffer memory 71 is electrically connected to the cache controller 70. The cache controller 70 is electrically connected to the first bus 50 and the second bus 60. The instruction memory 30 is electrically connected to the first bus 50. The data memory 40 is electrically connected to the first bus 50. The system memory 20 is electrically connected to the second bus 60. The DMA 80 is electrically connected to the second bus 60. The external device 90 is electrically connected to the second bus 60. The first bus 50 is electrically connected to the second bus 60.

In this embodiment, the microcontroller 10 transmits and receives data to and from the instruction memory 30 and the data memory 40 through the first bus 50. The microcontroller 10 transmits and receives data to and from the system memory 20 and the external device 90 through the second bus 60. The instruction memory 30 and the data memory 40 transmit and receive data to and from the system memory 20 through the second bus 60 connected to the first bus 50.

The cache controller 70 controls the writing or reading of data in the buffer memory 71. The cache controller 70 transmits and receives data to and from the microcontroller 10 through the first bus 50. The cache controller 70 performs data transmission with the system memory 20 through the second bus 60.

In this embodiment, application programs of the microcontroller architecture 100 are all stored in the system memory 20. Commonly used sub-programs are stored in the instruction memory 30 and the data memory 40.

In this embodiment, the microcontroller 10 can read the data in the system memory 20. When the microcontroller 10 needs to read data in the system memory 20, the microcontroller 10 firstly checks whether the same data exists in the buffer memory 71 through the cache controller 70 connected to the first bus 50. When the same data exists in the buffer memory 71, the microcontroller 10 reads the data directly in the buffer memory 71 through the cache controller 70 and the first bus 50. Otherwise, the microcontroller 10 can read the data in the system memory 20 through the second bus 60.

In this embodiment, the system memory 20 uses an instruction stack and a data stack for storage. The instruction stack can be transferred to the instruction memory 30 through the DMA 80 connected to the second bus 60 or the microcontroller 10. The data stack can be transferred to the data memory 40 through the DMA 80 connected to the second bus 60 or the microcontroller 10.

When the instruction stack is transferred to the instruction memory 30 and the data stack is transferred to the data memory 40, the microcontroller 10 can directly read the instructions and data in the instruction memory 30 and the data memory 40 through the first bus 50. Furthermore, the microcontroller 10 can also write data to the instruction memory 30 and the data memory 40 through a data bus.

In this embodiment, the microcontroller 10 can also directly carry out data transmission with the cache controller 70, no other ports will compete for the right to use the first bus 50 at this time.

In this embodiment, the DMA 80 sends and receives data to and from the system memory 20 through the second bus 60. The DMA 80 also sends and receives data to and from the instruction memory 30 and the data memory 40 through the first bus 50 connected to the second bus 60.

Refers to FIG. 1 again, in traditional microcontroller architecture, when the DMA transmits data, the DMA directly controls the bus. Therefore, there is a problem of transferring the right of bus control. That is, before the DMA transmits data, the microcontroller must transfer the right of bus control to the DMA. After the DMA ends a transmission, the DMA should return the right of bus control to the microcontroller. During the DMA transmission, the microcontroller cannot send and receive data to or from other units through the bus, which wastes system resources and reduces efficiency.

In FIG. 2, the DMA 80 can directly achieve memory access through the second bus 60 without the microcontroller 10 transferring the right of bus control.

Furthermore, due to the sub-programs being stored in the instruction memory 30 and the data memory 40, flexibility of storing the sub-programs in the system memory 20 is increased and performance of the system memory 20 is improved.

Using the microcontroller architecture 100, the traditional single bus is divided into a first bus 50 and a second bus 60. The first bus 50 and the second bus 60 are respectively connected to different components to solve many existing problems in the traditional architecture, such as arbitration of priorities, data reading latency, and inefficiency, thereby improving an overall performance of the microcontroller architecture 100.

Figure 3:
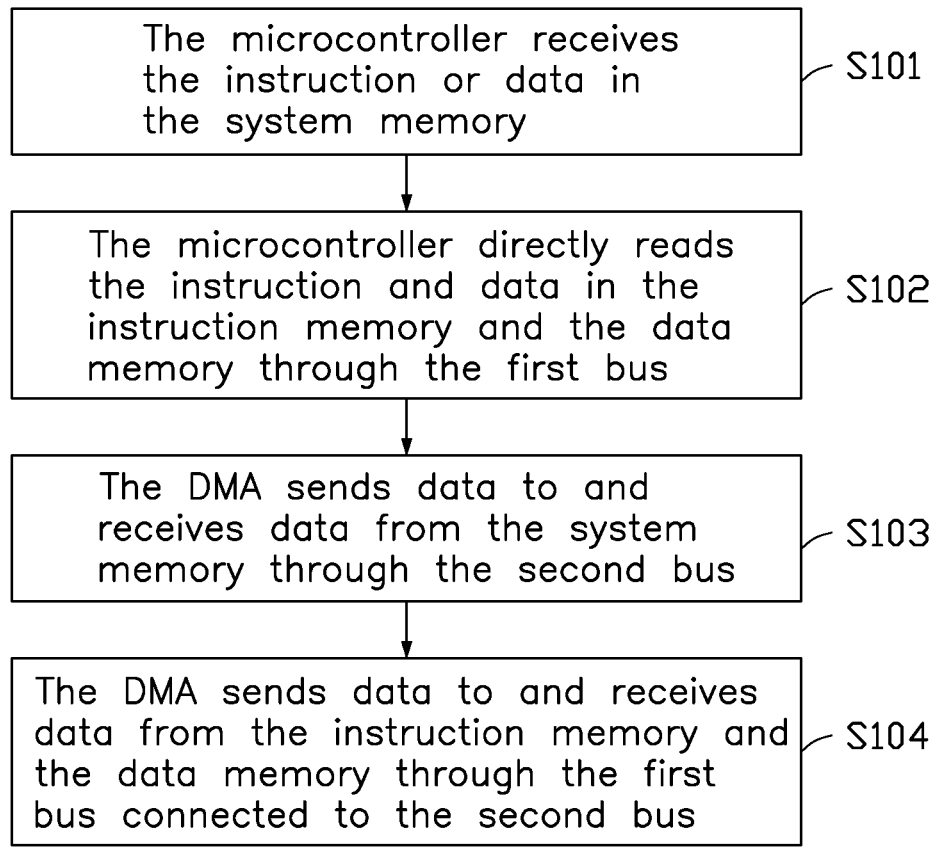
FIG. 3 is a flowchart of a method for reading data for the microcontroller architecture shown in FIG. 2, according to an embodiment of the present disclosure.

FIG. 3 illustrates a flowchart of a data reading method in the microcontroller architecture. The method is provided by way of example, as there are a variety of ways to carry out the method. Each block shown in FIG. 3 represents one or more processes, methods, or subroutines which are carried out in the example method. Furthermore, the order of blocks is illustrative only and additional blocks can be added or fewer blocks may be utilized without departing from the scope of this disclosure.

At block S101, the microcontroller 10 receives the instruction code or data code in the system memory 20.

In block S101, application programs of the microcontroller architecture 100 are all stored in the system memory 20. Commonly used sub-programs are stored in the instruction memory 30 and the data memory 40.

In block S101, when the microcontroller 10 reads data in the system memory 20, block S101 further includes the following sub-blocks.

Sub-block 1, the microcontroller 10, through the cache controller 70, firstly checks whether the buffer memory 71 has data the same as the data in the system memory 20. When the same data exists in the buffer memory 71, sub-block 2 is processed. Otherwise, sub-block 3 is processed.

Sub-block 2, the microcontroller 10 directly reads the data in the buffer memory 71 through the cache controller 70 and the first bus 50.

Sub-block 3, the microcontroller 10 reads the data in the system memory 20 through the second bus 60.

At block S102, the microcontroller 10 directly reads the instruction and data in the instruction memory 30 and the data memory 40 through the first bus 50.

In block S102, the system memory 20 stores code in instruction stack and data stack. The instruction stack can be transferred to the instruction memory 30 through the DMA 80 connected to the second bus 60 or the microcontroller 10. The data stack can be transferred to the data memory 40 through the DMA 80 connected to the second bus 60 or the microcontroller 10.

In block S102, the microcontroller 10 can also write data to the instruction memory 30 and the data memory 40 through a data bus and the first bus 50.

At block S103, the DMA 80 sends and receives data to and from the system memory 20 through the second bus 60.

At block S104, the DMA 80 sends and receives data to and from the instruction memory 30 and the data memory 40 through the first bus 50 connected to the second bus 60.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A microcontroller architecture comprising:
a first bus;
a second bus electrically connected to the first bus;
a microcontroller electrically connected to the first bus and the second bus;
an instruction memory electrically connected to the first bus;
a data memory electrically connected to the first bus;
a system memory electrically connected to the second bus; and
a DMA electrically connected to the second bus;
wherein the microcontroller transmits and receives data to and from the instruction memory and the data memory through the first bus, the microcontroller transmits and receives data to and from the system memory through the second bus, the instruction memory and the data memory transmits and receives data to and from the system memory through the second bus connected to the first bus;
wherein the DMA sends data to and receives data from the system memory through the second bus, and the DMA sends data to and receives data from the instruction memory and the data memory through the first bus connected to the second bus; and
wherein the system memory stores an instruction stack and a data stack, the instruction stack is transferred to the instruction memory through the DMA or the microcontroller, and the data stack is transferred to the data memory through the DMA or the microcontroller.

2. The microcontroller architecture of claim 1, further comprising:
a cache controller electrically connected to the first bus and the second bus; and a buffer memory electrically connected to the cache controller;

wherein the cache controller controls writing or reading of data in the buffer memory, the cache controller transmits and receives data to and from the microcontroller through the first bus, and the cache controller performs data transmission with the system memory through the second bus.

3. The microcontroller architecture of claim 2, wherein when the microcontroller reads the data in the system memory, the microcontroller firstly checks whether the same data exists in the buffer memory through the cache controller;

wherein when the same data exists in the buffer memory, the microcontroller directly reads the data in the buffer memory through the cache controller and the first bus, otherwise, the microcontroller reads the data in the system memory through the second bus.

4. The microcontroller architecture of claim 1, wherein application programs of the microcontroller architecture are all stored in the system memory, and commonly used sub-programs are stored in the instruction memory and the data memory.

5. The microcontroller architecture of claim 1, further comprising an external device, wherein the external device is electrically connected to the second bus and transmits and receives data to and from the microcontroller through the second bus.

6. A data reading method in a microcontroller architecture, the microcontroller architecture comprising a microcontroller, a system memory, an instruction memory, a data memory, a DMA, a first bus, and a second bus, wherein the second bus, the instruction memory, and the data memory electrically connected to the first bus, the microcontroller electrically connected to the first bus and the second bus, the system memory electrically connected to the second bus, and the DMA electrically connected to the second bus, the method comprising:

the microcontroller transmitting data to and receiving data from the instruction memory and the data memory through the first bus;

the microcontroller transmitting data to and receiving data from the system memory through the second bus;

the instruction memory and the data memory transmitting data to and receiving data from the system memory through the second bus connected to the first bus;

the DMA sending data to and receiving data from the system memory through the second bus;

the DMA sending data to and receiving data from the instruction memory and the data memory through the first bus connected to the second bus; and wherein the system memory stores an instruction stack and a data stack, the instruction stack is transferred to the instruction memory through the DMA or the microcontroller, and the data stack is transferred to the data memory through the DMA or the microcontroller.

7. The data reading method of claim 6, wherein the microcontroller architecture further comprises a cache controller and a buffer memory, the cache controller is electrically connected to the first bus and the second bus, the buffer memory is electrically connected to the cache controller, wherein the method further comprises:

the cache controller controlling writing or reading of data in the buffer memory;

the cache controller transmitting data to and receiving data from the microcontroller through the first bus; and the cache controller performing data transmission with the system memory through the second bus.

8. The data reading method of claim 7, wherein when the microcontroller reads the data in the system memory, the method further comprising:

the microcontroller checking whether the same data exists in the buffer memory through the cache controller;

when the same data exists in the buffer memory, the microcontroller directly reading the data in the buffer memory through the cache controller and the first bus;

otherwise, the microcontroller reading the data in the system memory through the second bus.

9. The data reading method of claim 6, wherein application programs of the microcontroller architecture are all stored in the system memory, and commonly used sub-programs are stored in the instruction memory and the data memory.

* * * * *